Jan. 24, 1967 R. M. WILSON 3,299,704
APPARATUS TO PREVENT LIQUID METER FROM RECORDING GAS
Filed Aug. 31, 1964
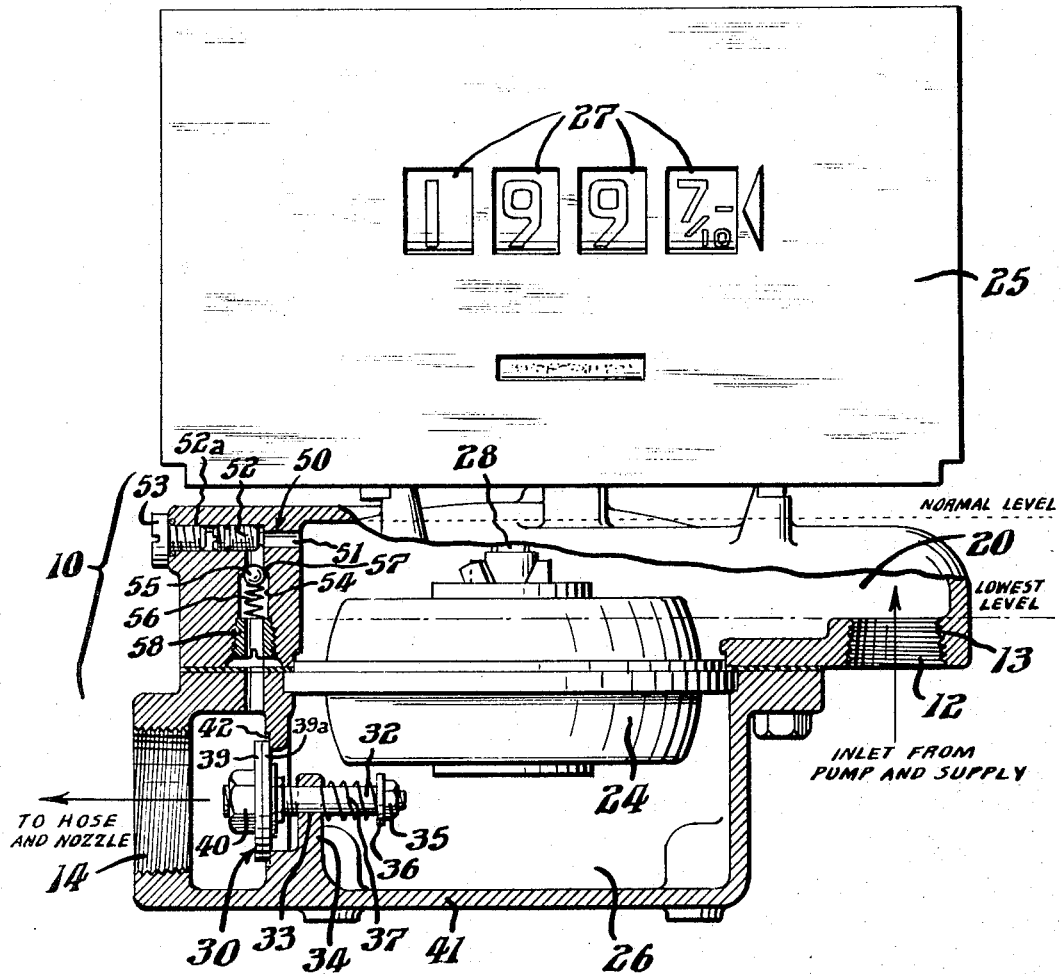
INVENTOR.
Ronald M. Wilson,
BY
Paul & Paul
ATTORNEYS.

United States Patent Office 3,299,704
Patented Jan. 24, 1967

3,299,704
APPARATUS TO PREVENT LIQUID METER FROM RECORDING GAS
Ronald M. Wilson, Ambler, Pa., assignor to William M. Wilson's Sons, Inc., Lansdale, Pa., a corporation of Pennsylvania
Filed Aug. 31, 1964, Ser. No. 393,042
4 Claims. (Cl. 73—200)

This invention relates to an improvement in a liquid meter which prevents the meter from recording gas. The apparatus of this invention finds special utilization as part of a low cost gasoline dispensing system intended for consumer operation and use.

In greater detail, this invention provides an improvement in the art of measuring liquid flow by which a known quantity of liquid is continually by-passed around the meter during normal operation, said by-pass serving to remove gas from the system and prevent liquid flow through the meter, when during abnormal operation, gas accumulates to a certain level.

The operation of fluid meters of the displacement type whose purpose is to measure the flow of relatively dense fluids, such as water, gasoline, etc., is rendered uncertain and unreliable by entrained air, gas or vapor which is permitted to pass through the meter with the denser fluid, since such air, gas or vapor itself occupies the volume of the displacement space. The presence of gas causes an unknown error in the registration of the meter as to the actual volume of the denser fluid passing through the system. This unreliability is particularly acute in measuring gasoline which easily sets free a considerable volume of vapor. Therefore, it is the primary object of this invention to provide apparatus to overcome the inability of the standard liquid displacement meter to differentiate between liquid and gas flowing through the system.

In systems intended to dispense gasoline and similar liquids for regular commercial sale, it has been standard practice to employ rather elaborate arrangements of floats, valves and air separation chambers to ensure accuracy in the quantity of liquid being pumped under all conditions. For relatively small operations and use, such as on a construction job or farm, the highest degree of accuracy is not required, and apparatus that will merely stop the meter and prevent a flow of liquid in the event of gas accumulation in the system is sufficient. If the dispensing system is not provided with such apparatus, the system will pump air when, for instance, the supply tank is empty, and the meter will continue to turn giving a grossly inaccurate reading. In such a case, the user may believe his vehicle is refueled when it is not resulting, at best, in inconvenience and embarrassment. Therefore, it is another object of this invention to provide inexpensive, yet effective, apparatus which will cause the meter to stop when air is delivered to it instead of liquid.

This invention may be considered as an improvement over apparatus disclosed in U.S. Patent No. 1,130,792, issued to J. M. Burton on March 9, 1915, which discloses use of a by-pass for gas around the meter. The essential difference between the Burton apparatus and the invention disclosed hereinbelow is that Burton employs a float and a pair of valves to close the by-pass when only liquid is flowing and to open the by-pass and close the meter entrance when gas is present in the system. It is the particular advantage of this invention over Burton's apparatus and the prior art that float chambers and associated valves are dispensed with and the by-pass is in continuous use to either prevent gas flowing through the meter or allow a predetermined and adjustable quantity of liquid to flow thereby allowing more precise adjustment of the recording system. The above objects and attendant advantages of this invention will become more apparent from the description set forth hereinbelow and from the attached drawing which illustrates the preferred form of the apparatus of this invention, partly in section and partly in side elevation.

The following description is directed to the specific form of the invention illustrated in the drawing and is not intended to limit the scope of the invention itself which may be practiced in a wide variety of forms and arrangements.

A typical small consumer system in which the apparatus of this invention finds particular advantageous use includes a supply tank holding the liquid, a suitable pump and pump motor, a meter to measure the liquid pumped, a register for recording the rotation of the meter and hose and nozzle for discharging the liquid in a vehicle or the like. In the drawing, the supply tank, pump and pump motor and hose and nozzle are not shown, as any standard form of these devices may be employed and only the meter and register, together with the apparatus for preventing false recording of gas or air are shown. The liquid, such as gasoline, is pumped from the supply tank under a desired pressure to the apparatus of this invention, generally designated by the numeral 10, through the inlet 12, through the meter 24 and subsequently discharged through the outlet 14 to a hose and nozzle. A register such as that disclosed in my co-pending application Serial No. 299,577, filed on August 2, 1963 (now abandoned), may be employed in connection with the metering apparatus 10 of this invention.

In greater detail, the apparatus 10 includes a surrounding casing 41 (which may be considered as an integral part of the liquid flow conduit) which is divided internally in half by the meter 24 into a separation chamber 20 and a meter discharge chamber 26. Liquid is pumped under pressure through inlet 12, which is equipped with threads 13 for connection to a supply conduit (not shown), into separation chamber 20 which may be equipped with a series of baffles (not shown) so that gas or air in the liquid will separate and tend to accumulate at the top of chamber 20 just beneath the internal surface of the casing 41. The normal level of liquid in chamber 20 flowing through the apparatus under normal gas free operation is indicated by the broken line. The lowest level of liquid when gas is present in the flow is indicated by the dot and dash line. A standard liquid displacement meter 24 is mounted between upper separation chamber 20 and the lower meter chamber 26 and joins the casing at the sides as shown. Liquid passing through the apparatus 10 passes almost completely through the meter 24, causes the internal rotor (not shown) to rotate, said rotation being recorded by the register 25 on a series of counting wheels 27 by connecting drive shaft 28 and gears (not shown). The main liquid flow, after passing through meter 24, is discharged into chamber 26 and, due to the pressure in the liquid created by the pump, causes pressure responsive valve 30 to open and allow the discharge of the liquid through threaded outlet 14.

Back pressure valve 30 comprises a shaft 32 mounted within a bore 33 of casing flange 34. On the inner end of shaft 32, a threaded nut 35 and washer 36 hold spring 37 against flange 34 in the position shown. At the outer or discharge end of shaft 32, a sealing member 39 is held in position by nut 40. The sealing member 39 is pulled against an annular valve seat 42 formed in the casing 41 by spring 37 (as shown in the drawing) when the pressure of the fluid against the inner surface 39a of the valve is insufficient to overcome the force of spring 37. When the liquid pressure in chamber 26 increases to that of normal operations, i.e., without the accumulation of gas in chamber 20, valve 30 is opened by said pressure and liquid flows from casing opening 14.

A by-pass channel or conduit 50 is provided within casing 41 to allow gas or air to flow from the separation chamber 20 to the outlet side of the valve 30. The by-pass conduit 50 includes a channel 51 extending from chamber 20 past adjustable valve 52 threadedly mounted in a bore 52a in the casing 41. A threaded cap 53 prevents accidental movement of the location of valve 52 in bore 52a. By-pass conduit 50 further includes a larger diameter chamber 54 in which is located a check valve consisting of ball 55 urged by a weak spring 56 into sealing contact with annular seat 57. A threaded sleeve 58, forming the base for spring 56, is mounted in the casing as shown.

The by-pass conduit 50 serves two functions during the operation of the system. It allows a controlled and closely determined volume of liquid to by-pass the meter during normal operation when the system is pumping only liquid thereby providing means for adjusting the meter as explained further hereinbelow. Secondly, conduit 50 by-passes gas or air accumulated in chamber 20 around the meter 24 thereby allowing pressure within both chambers 20 and 26 to be reduced and allowing valve 30 to close.

During normal operations, liquid flowing from the pump under a desired pressure enters the casing 41 through inlet 12, passes through the meter turning the rotor and is discharged past the open valve 30 through the outlet 14. A small portion of the liquid (about 1½% to 2% of the total amount of the liquid entering the chamber 20) passes through the by-pass 50 by depressing the check valve ball 55 and joins the main flow downstream of the meter and valve 30. The by-passing of a small, adjustable quantity of liquid is useful in regulating the accuracy of the meter for the following reasons. The meter passes a fixed volume of liquid during each cycle, but due to necessary tolerances in the working parts of the meter and the variations in the viscosity of the liquid being measured, it has been found impossible to select a gear ratio between the meter and register to record or translate exactly the cycles of the meters into counting units such as gallons or quarts. It is therefore customary to provide gearing such that if it were not for the by-pass, the register would record 101½% to 102% of the liquid actually being pumped. By varying the effective size of the by-pass conduit 50 by manipulation of valve 52, thereby adjusting the volume of liquid it will pass, the count indications on the register can be made to agree with the actual volume of liquid passing through the meter within very close tolerances.

The by-pass serves the additional function, in combination with the back pressure valve 30, of preventing a flow of gas or liquid and gas through the meter when a sufficient quantity of gas is present in the liquid. This operation is as follows. When the supply of liquid in the supply tank is exhausted or gas is injected into the flow by other means and the pump begins to deliver gas, the gas will be collected within the top area of the separation chamber 20. As gas flows much more freely than liquid through the restricted by-pass tube 50, the gas collected in chamber 20 quickly and continually discharges through tube 50, pushing ball valve 55 against spring 56 and opening the check valve to flow out the casing outlet 14. When a sufficient volume of air is being pumped by the pump and subsequently discharged by conduit 50, the quantity of liquid in chamber 20 progressively diminishes to a position proximate the level shown in the drawing. At this point, liquid pressure in chamber 20 and chamber 26 becomes insufficient to hold valve 30 in the open condition. Valve member 39, under pressure of spring 37, closes against seat 42 preventing further flow of liquid out of chamber 26 and, thereby, preventing a flow through meter 24. At its lowest point, the liquid still covers the meter 24 preventing air from moving through the meter. When the supply of liquid is replenished in the supply tank, the pump will again deliver liquid raising the pressure in chambers 20, 26 so as to open valve 30 and allow discharge of the liquid from the casing 41 and through the meter 24. The by-pass orifice, while large enough to pass the entire volume of air delivered by the pump, is so restricted in size that when liquid is forced to pass therethrough, sufficient pressure is built up to open the back pressure valve 30. Only an adjustable and predetermined amount of liquid such as 1½% to 2% of the volume of liquid entering the casing will be by-passed and the meter again will register the flowing liquid accurately.

The check valve is deemed necessary in by-pass conduit 50 to prevent a back flow of liquid into chamber 20 under certain conditions. In a typical installation, when the nozzle is closed and the pump continues to run the intermittent pulsations of the pump will cause small amounts of liquid to pulse through the meter in their forward movement and slightly expand the discharge hose. As each pulse ends, the hose, because of its elastic quality, will contract and push a small amount of liquid back through the meter. In the conventional meter, not having the back pressure valve 30, the pulsing of minute amounts of liquid, first one way then the other, in response to the pulsations of the pump, has no effect on the measurement since there is no net forward of the meter. In my invention, however, such pulsations, being unable to go back past check valve 30, would flow up through bypass conduit 50 as the hose contracts and at the next pulse a part of the return or forward flow would pass through the meter 24 and by thus recirculating produce a false indication of delivery. The check valve provided in the by-pass completely overcomes this false registration or "creep."

The apparatus of this invention has been described as forming part of a relatively small consumer dispensing system; however, it should be clear that the principle disclosed is adaptable to other uses in other environments.

Although this invention has been disclosed with reference to specific forms and embodiments thereof, it will be appreciated that a great number of variations may be made without departing from the spirit or scope of this invention. For example, parts may be reversed, equivalent elements may be substituted for those specifically disclosed and certain features of the invention may be used independently of other features, all without departing from the spirit and scope of this invention as defined in the appended claims.

Having described my invention, I claim:

1. Apparatus for measuring the quantity of liquid flowing through a conduit and preventing false measuring of vapor, the combination comprising a casing having an intake opening and a discharge opening interconnected within a liquid flow conduit for flow of liquid to be measured, an upper separation chamber and a lower discharge chamber formed within the casing and separated by a liquid displacement meter so that liquid flowing into the casing passes first into the separation chamber, then through the meter so as to be measured and lastly into the discharge chamber, a pressure responsive valve located between the discharge chamber and the discharge opening of the casing, said valve being biased toward the closed position to prevent a flow of liquid from the discharge chamber upon a reduction in pressure in the liquid in the discharge chamber below a predetermined flow pressure, a by-pass conduit extending from a point located at substantially the uppermost level of said separation chamber to a point adjacent the discharge opening of the casing downstream of the pressure responsive valve, said conduit allowing a predetermined quantity of liquid to pass therethrough to accurately calibrate the meter when only liquid is passing through the casing and when vapor is present in the uppermost part of the separation chamber, allowing the vapor to flow out of the separation chamber so as to reduce the pressure in both chambers, thereby causing the pressure responsive valve to close preventing a flow of liquid or vapor through the meter and thereby preventing the meter from recording while said pressure is thus reduced.

2. The apparatus as defined in claim 1 further including a unidirectional valve mounted within the by-pass conduit, said valve being biased to prevent a flow of liquid or vapor into the separation chamber through the valve but allowing a flow through the valve and out of said chamber at a predetermined by-pass pressure.

3. The apparatus as defined in claim 2 further including means for adjusting the effective diameter of the by-pass conduit whereby the desired rate of flow of liquid through the conduit may be controlled to more accurately calibrate the meter.

4. The apparatus as defined in claim 2 in which the bias of the by-pass valve is less than the bias of the discharge chamber valve.

References Cited by the Examiner
UNITED STATES PATENTS

| | | | |
|---|---|---|---|
| 1,941,925 | 1/1934 | Bassett | 73—254 |
| 1,969,024 | 8/1934 | Miano | 73—200 |

RICHARD C. QUEISSER, *Primary Examiner.*

E. D. GILHOOLY, *Assistant Examiner.*